R. A. GOETH, R. B. RODGERS & J. A. DITTMAR.
AUTOMOBILE PUMP.
APPLICATION FILED APR. 26, 1912.

1,054,762. Patented Mar. 4, 1913.

WITNESSES

INVENTORS
Richard Anton Goeth
Robert B. Rodgers
John Albert Dittmar
BY
ATTORNEYS

UNITED STATES PATENT OFFICE.

RICHARD ANTON GOETH, ROBERT B. RODGERS, AND JOHN ALBERT DITTMAR, OF SAN ANTONIO, TEXAS.

AUTOMOBILE-PUMP.

1,054,762.   Specification of Letters Patent.   Patented Mar. 4, 1913.

Application filed April 26, 1912. Serial No. 693,410.

*To all whom it may concern:*

Be it known that we, RICHARD ANTON GOETH, ROBERT B. RODGERS, and JOHN ALBERT DITTMAR, citizens of the United States, and residents of San Antonio, in the county of Bexar and State of Texas, have invented a new and Improved Automobile-Pump, of which the following is a full, clear, and exact description.
The invention relates to that form of automobile pump having means for attaching it to an automobile wheel, and for actuating the pump by the revolution of the wheel for the purpose of inflating the tires.
An object of our invention is to provide a pumping attachment of the character referred to, which is attachable to any wheel regardless of the size and form of the hub, or the absence of any projection of the hub beyond the face of the wheel.

A further object is to provide means so designed as to permit of securing the attachment to such wheels as are provided with large brake drums.
A further object is to simplify the construction of pumps of the indicated character, to the end that few parts will be involved, and whereby the attachment can be secured to the wheel and detached therefrom quickly and conveniently.

The distinguishing features of the invention and the important structural elements in the preferred embodiment which is given as an example, will be more particularly explained in the specific description hereinafter to be given.

Reference is to be had to the accompanying drawings forming a part of this specification, in which similar characters of reference indicate corresponding parts in both views.

Figure 1:
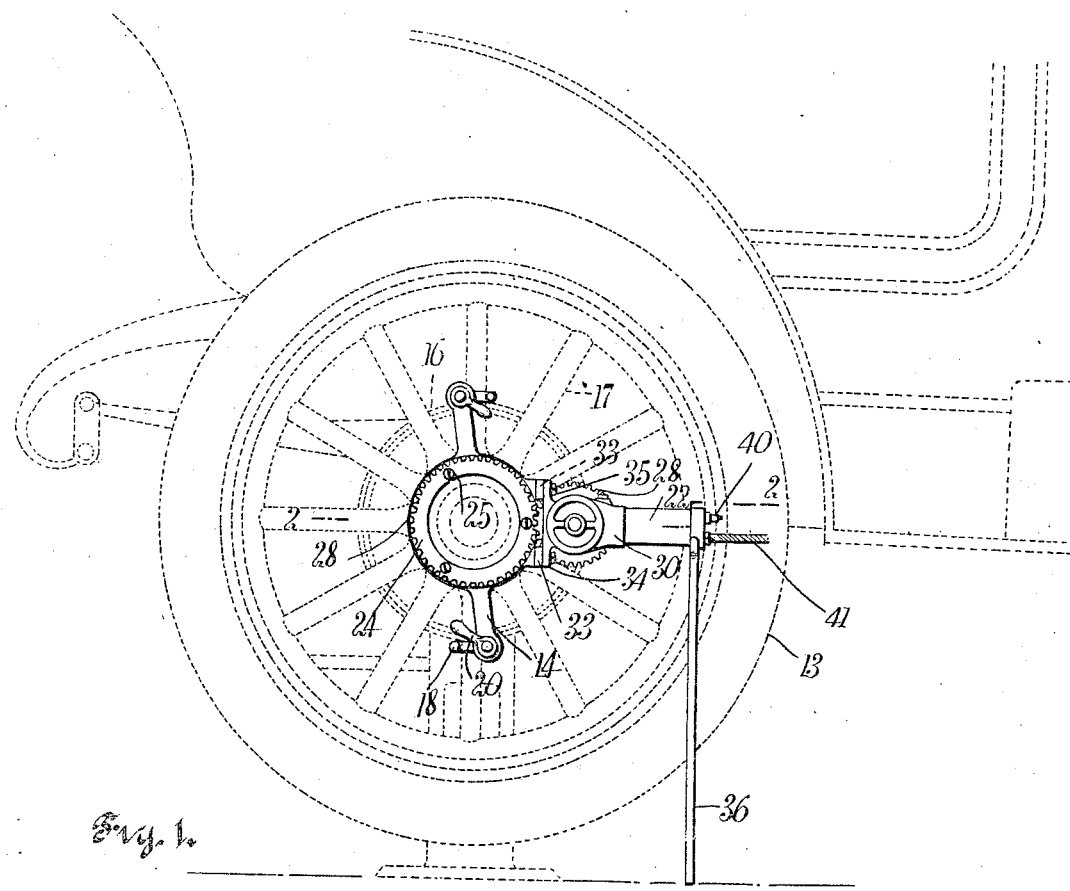
Figure 2:
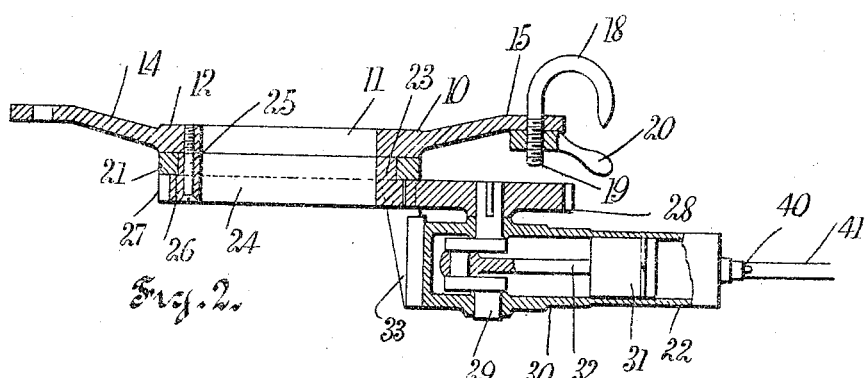

Figure 1 is a side elevation of our improved pump and appurtenances, showing the same in position for use; and Fig. 2 is a horizontal section of the pump on about the line 2—2 in Fig. 1, but showing the member having the securing arms of the attachment moved approximately 90 degrees from the position shown in Fig. 1.
In constructing an attachment in accordance with the illustrated example, a flat ring 10 is provided, the open center 11 of which is of a size to pass freely over any hub of standard cars, the inner face 12 of the ring being adapted to lie close against the outer face of the wheel 13. The ring 10 is provided with two or more arms 14, which extend preferably on radial lines and at diametrically opposite points. The arms may be connected in any suitable manner with the ring 10. In the illustrated example these arms are integral with the ring; they extend to a point sufficiently distant from the hub for the ends 15 to reach beyond the brake drum 16 of the wheel, regardless of the size of said drum. The outer ends of the arms 14 carry suitable means for clamping engagement with the wheel; in the illustrated example the devices are adapted to engage with the spokes 17 of the wheel, the clamping device shown consisting of a hooked bolt 18 having a threaded shank 19 that extends from the ends 15 of the arms 14, and carries lever nuts 20. The ring 10 supports a loose ring 21 carrying the air pump 22, said ring 21 in the illustrated example being received on the reduced inner end 23 of an outer ring 24, which is secured to the ring 10. In the illustrated example, the outer ring 24 is attachable to the ring 10 and readily detachable therefrom by means of screws 25 or their equivalents. The outer portion of the ring 24 has a diameter sufficiently larger than the inner reduced portion 23 to form a shoulder 26, so that the said ring 24 constitutes a retainer for the loose ring 21, and said ring 24 constitutes an actuating member for the pump 22, and for this purpose suitable teeth 27 are formed on the outer periphery of the ring 24, so that the latter constitutes a gear wheel which in the illustrated example is a spur gear; it meshes with a pinion 28 that is keyed to the inner end of the crank shaft 29, said crank shaft desirably operating in the hollow base or crank case 30 of the pump 22, and being connected to the interior of the trunk piston 31 of the air pump by the piston rod or connecting rod 32. Advantageously in the preferred form of the invention as illustrated, the pump 22 is attachable to and detachable from the ring 21 so as to dismember the parts to assemble the same in small compass when not in use, and to this end the loose ring 21 is formed with feet 33 projecting outward parallel with the axis of the said ring to constitute brackets, and the base of crank case 30 of the pump is formed with a flange 34 at each side, said flanges being secured, as by bolts 35, to the feet 33 of the loose ring 21, so that the pump body is thus held rigid with the said loose ring.

The described construction, as will be obvious, permits the rotation of the ring 10 and the outer ring 24 with the wheel of the car, and relatively to the loose ring 21 and the pump. To hold the pump and the ring 21 from revolving with the supporting rings 10, 24, the outer end of the pump casing is provided with a pivoted leg 36, which, when the pump is in place on the wheel, is brought down to engage the ground or the floor of the garage, and hold the pump with the supporting ring 21 against rotation. The pump is provided with any approved inlet valve 40 and with a discharge provided with a length of hose 41, which in practice, is connected with the inlet valve of the tire to be inflated.

It is not of prime importance that the member 10 be in ring form, other than its having a bore or eye to pass over any projecting hub on standard cars, and its configuration may vary so that it constitutes a plate to lie against the outer face of the wheel at the inner ends of the spokes. The described member 10 and the ring 24 are in fixed relation to each other, it will be observed, and constitute, therefore, a unitary, revoluble device forming, with the arms 14 and the clamp bolts, a centering device and securing means having a bore of a diameter to pass over any projecting hub, and serving to hold the attachment to the wheel independently of the hub and axle spindle. In addition, the said revoluble unitary device constitutes a retaining means for the pump, by reason of clamping the loose pump-carrying ring 21 in what is in effect a peripheral annular groove, and furthermore by reason of the gear teeth 27, co-axial with the wheel, the described revoluble device constitutes the prime mover of the pump-actuating gear.

Having thus described our invention, we claim as new and desire to secure by Letters Patent:

1. A pumping attachment for automobile wheels, comprising a revoluble device, a pump-carrying member loose on said revoluble device, and operating connections between the revoluble device and the pump, said revoluble device having a bore or eye to pass over any projecting hub as well as to fit wheels without projecting hubs, and comprising an inner member to lie against the face of the wheel and carrying wheel-clamping arms, and an outer member having gear teeth to constitute the prime mover of the pump-actuating device, said actuating device including also a pinion in mesh with the said gear teeth, a crank shaft operating in the pump casing and carrying said pinion, means connecting the crank shaft and the pump piston, and means for holding the pump and its carrying member against turning with the revoluble device.

2. A pumping attachment for automobiles comprising a revoluble member carrying wheel-clamping arms, a piston pump having its base adjacent to the revoluble member, an annular member in fixed relation to the pump at the base thereof, said annular member loosely surrounding the revoluble member, a crank shaft operating in the pump case, a pinion on the crank shaft, and gear teeth on the said revoluble member in mesh with the said pinion.

3. A pump attachment for automobiles comprising a revoluble device formed with lateral arms carrying wheel-clamping devices, the said revoluble device having an open center to pass over any projecting hub, a piston pump having its base adjacent to the revoluble device, an annular member in fixed relation to the pump at the base thereof, and loosely surrounding the revoluble device, a crank shaft, a connection between the pump piston and the crank shaft, a pinion on the crank shaft, and gear teeth on the said revoluble device and meshing with the said pinion.

4. A pump attachment for automobiles comprising a unitary, revoluble device presenting an annular peripheral groove and having arms serving to hold the attachment to the wheel independently of the hub and axle spindle, a loose member mounted in the annular groove presented by the revoluble device, a pump carried by said loose member, actuating devices for the pump, said actuating devices including gear teeth on the mentioned revoluble device, a pinion on the pump case, and driving connections between the pinion and the pump piston.

5. A pump attachment for automobiles, comprising a two-part unitary, revoluble device presenting an annular peripheral groove between the two parts, the inner part of the revoluble device having wheel-clamping means serving to hold the attachment to the wheel independently of the hub and axle spindle, a loose member mounted in the annular groove of the revoluble device between the two parts of said device, and formed with a lateral bracket, a pump having its base end adjacent to said revoluble device, a detachable connection between the bracket of the loose member and the base end of the pump, and means for preventing the rotation of the pump and the loose member.

6. A pumping attachment for automobile wheels, comprising a revoluble device consisting of inner and outer rings, means for securing said rings together to rotate in unison, the inner ring having means for securing the united device to a wheel and having a through-bore, a third ring loosely clamped between the said united inner and outer rings, which latter rotate as a unit relatively to the said third ring, a pump casing supported from the said third ring, and driving means for the pump, one element of the driving means being carried by the casing that is supported on the mentioned third ring, and a co-acting element of the driving means being formed on the outer one of the first mentioned rings.

7. A pumping attachment for automobile wheels comprising separate inner and outer rings, means for detachably uniting said rings, the outer ring having a reduced external diameter at its inner side, the two rings having a through-bore for the passage of a hub, a third ring mounted on the reduced part of the first mentioned rings, a bracket extending outward from the said third ring beyond the outer one of the first-mentioned rings, a pump casing having flanges bolted to said bracket, and driving gear for the pump, said driving gear including a driven element on the shaft of the pump, and a driving element in fixed relation to the outer of the first mentioned rings.

In testimony whereof we have signed our names to this specification in the presence of two subscribing witnesses.

RICHARD ANTON GOETH.
ROBERT B. RODGERS.
JOHN ALBERT DITTMAR.

Witnesses:
   THEODORE FLETCHER,
   CHARLES DITTMAR.